March 18, 1924.

H. W. TAYLOR

INDUCTION DYNAMO ELECTRIC MACHINE

Filed Feb. 15, 1922   3 Sheets-Sheet 1

1,487,286

Inventor:
Henry W. Taylor,
by Albert G. Davis
His Attorney.

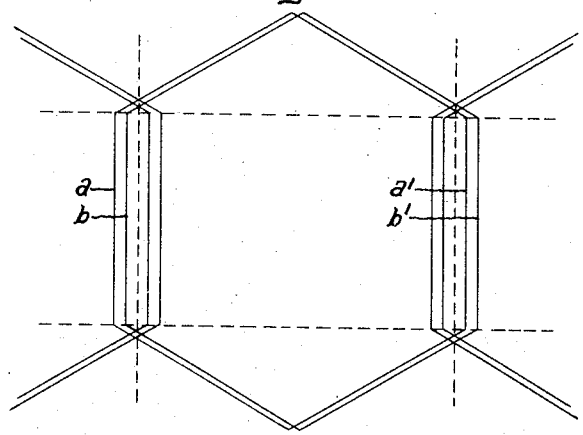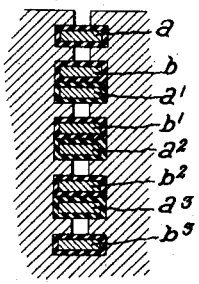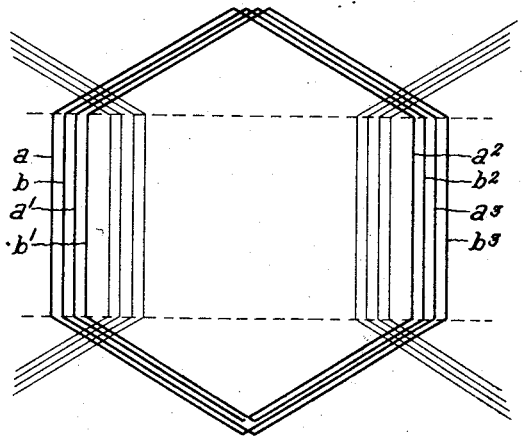

March 18, 1924.

H. W. TAYLOR

INDUCTION DYNAMO ELECTRIC MACHINE

Filed Feb. 15, 1922   3 Sheets-Sheet 3

1,487,286

Inventor:
Henry W. Taylor,
by
His Attorney.

Patented Mar. 18, 1924.

1,487,286

UNITED STATES PATENT OFFICE.

HENRY W. TAYLOR, OF RUGBY, ENGLAND, ASSIGNOR TO GENERAL ELECTRIC COMPANY, A CORPORATION OF NEW YORK.

INDUCTION DYNAMO-ELECTRIC MACHINE.

Application filed February 15, 1922. Serial No. 536,774.

*To all whom it may concern:*

Be it known that I, HENRY WILLIAM TAYLOR, a subject of the King of Great Britain, residing at Rugby, in the county of Warwick, England, have invented certain new and useful Improvements in Induction Dynamo-Electric Machines, of which the following a specification.

My invention relates to improvements in the secondary windings of dynamo electric machines of the induction type. In such windings, it is desirable that the conductors have a high resistance when carrying current at the line frequency and a low resistance when carrying current at a slip frequency. In order to accomplish this, deep conductors in parallel sided slots have been used, but in many cases the depth of the conductors to produce the necessary multiplication of the resistance at the higher frequency is so great as to render such a construction impractical.

In addition composite conductors have been proposed consisting of an upper and lower section, the upper section usually having a much higher resistance than the lower section, the two sections being placed a short distance from one another in the slot and the intervening space being nearly filled with magnetic material. This construction, however, also has in practice limitations.

The object of my invention is to provide improvements in the construction of such composite conductors, and these consist essentially of using a number of such composite conductors in the depth of the slot and arranging that each unit conductor carries the same amount of current. In this way the currents which flow in the lower units produce extra circulating currents in the sections of the upper units and thus gives an increased resistance effect at high frequencies. I may arrange to connect the composite conductors or the sections of the composite conductors in a number of ways outside the core, as for instance the sections of the composite conductors may be joined together immediately after leaving the core, or at the end of each half turn so that the current induced in the sections of the upper composite conductors by the currents in the lower conductors passes only over the conductor in which it is generated.

Alternately I may arrange for the sections of some or all of the composite conductors to be continuously electrically insulated and I may arrange the order of the sections, as they traverse the various positions occupied by the conductor so that the voltage induced between them becomes cumulative.

The features of my invention which I believe to be novel and patentable will be pointed out in the claims appended hereto. The accompanying diagrams illustrate my invention, Fig. 1 indicating a form of composite conductor which has been used in previous constructions. Fig. 2 shows an improved arrangement consisting of two composite conductors in the same slot, and Figs. 3, 4 and 5 show different methods in which the ends of the sections of the composite conductors illustrated in Fig. 2 may be connected when they are made to form complete coils. Fig. 6 shows a further development of my invention in which four separate composite conductors are arranged in the same slot and Fig. 7 shows a method of making the end connections of the sections of the composite conductors illustrated in Fig. 6 so that the voltage induced between the sections may be cumulative.

Figure 1:
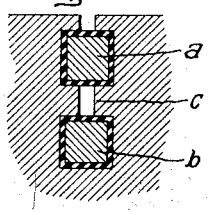
Fig. 1 shows a simple composite conductor in a slot, $a$ and $b$ indicating the sections of the conductor and $c$ the space between the sections which is partly occupied by magnetic material.

Although in the following description, I have described my invention with reference to the form of winding shown in Fig. 1, I do not limit myself to this form.

Figure 2:
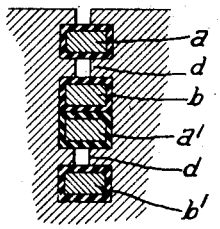
Figure 3:
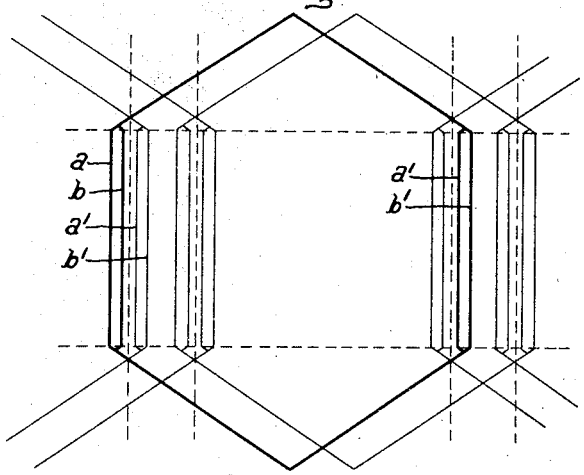
Figure 4:
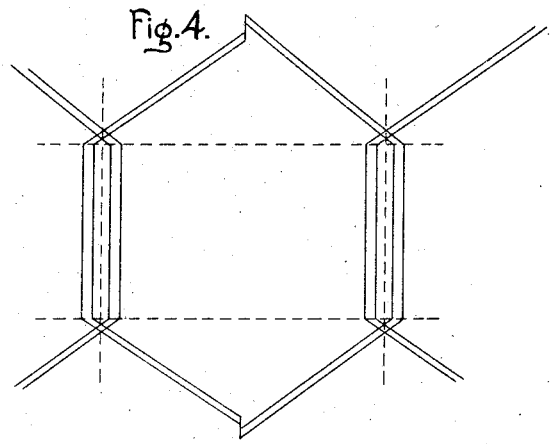

Fig. 2 illustrates a form of my invention in which I use two separate composite conductors in the same slot; $a$ and $b$ represents two sections which are associated with one another to form one conductor with the intervening slot space narrowed as at $d$ and below them, $a^1$ and $b^1$ are two further sections which form a second composite conductor electrically insulated as far as a single slot is concerned, from sections $a$ and $b$. In order that each of the two separate composite conductors may carry the same current I may form a succession of short-circuited coils as shown in Figs. 3, 4 and 5 by choosing slots preferably a pole pitch apart, and by taking the upper composite conductor on one pole and connecting it to the lower conductor in the next pole. In this way an upper composite conductor is always subjected to the magnetizing influence of a lower composite conductor and has generated in it a circulating current which in effect produces an increase in the equivalent resistance of the coil at higher frequencies. In Fig. 3 I have shown the section of the composite conductors joined solidly together at the ends of the slots, but in some cases it may be advantageous to extend the electrical separation and to only join the sections together at the end of the half turns as shown in Fig. 4

In Fig. 5 I have shown an arrangement in which there is no electrical connection between sections of the composite conductors throughout the turn and in this case it will be noticed that in order to produce the best effect I have connected the upper section $a$ of the upper composite conductor to the upper section $a^1$ of the lower composite conductor and the lower section $b$ of the upper conductor to the lower section $b^1$ of the lower conductor.

Referring now to Fig. 6, I have shown a form of my invention which consists of four composite conductors each consisting of two sections and all arranged in the same slot, all sections and conductors being electrically insulated from one another. It will be understood that in accordance with the principle of my invention as described above, the four conductors will be so connected that each conductor carries the same current and that the sections of the conductor may be connected in any of the manners previously shown in Figs. 3, 4 and 5. In Fig. 7 I have shown diagrammatically how the sections of the conductors may be connected in a manner corresponding to Fig. 5, so that there is no interconnection between the sections and all the upper sections, $a$, $a^1$, $a^2$, and $a^3$ are connected together in sequence and all the lower sections $b$, $b^1$, $b^2$, and $b^3$, are also connected together in sequence, so that the voltage generated in the sections of the upper conductors by the currents in the lower ones will become cumulative to a maximum degree.

Figure 8:
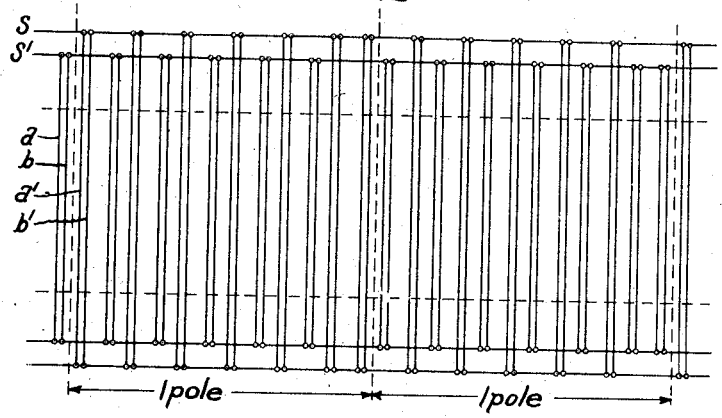
Figs. 8 and 9 show how composite conductors used in accordance with my invention may be connected to form the well-known squirrel cage form of windings.

Coming now to forms of my invention in which the composite conductors are connected to a common bar at the ends of the slots, in Fig. 8 I have shown an arrangement which is suitable for use when two composite conductors are arranged in the same slot to ensure that each conductor carries the same value of current. At each end of the winding I provide two short circuiting rings S, $S^1$, and having divided the total slots around the winding into sections corresponding to the number of poles, I connect for instance the top composite conductor on one pole to one set of short circuiting rings $S^1$, and on the other pole I connect the bottom composite conductor $a^1$, $b^1$ to the same rings $S^1$, and the top composite conductor $a$, $b$ to the other rings S.

Figure 9:
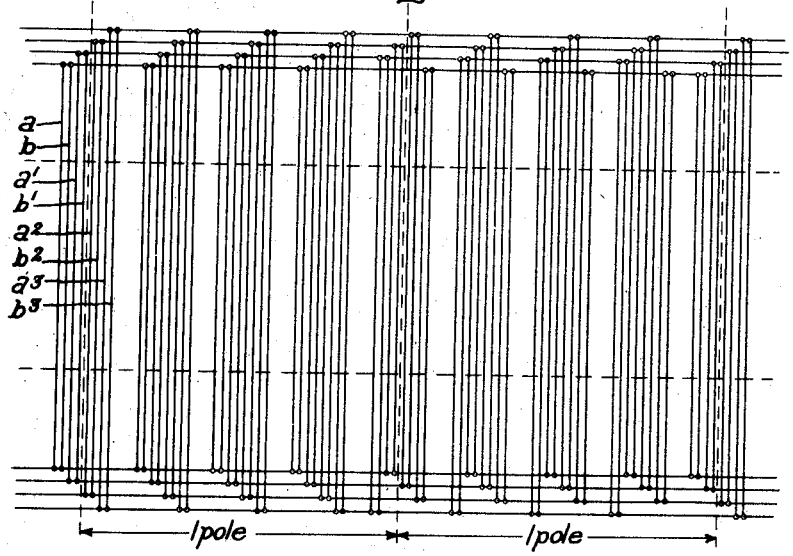

Further Fig. 9 shows the further development in which I use four composite conductors in each slot as shown in Fig. 6 and four short circuiting rings at each end of the rotor. It will be observed that I connect the different composite conductors to the different short circuiting rings on the adjacent poles so that current circulates through all four conductors before completing the circuit, I thereby ensure that the same current will flow in each conductor.

I do not wish to confine myself to the use of composite conductors consisting of two sections only as above described, nor do I wish to limit myself to the use of composite conductors having sections all of the same resistance. Also I do not wish to limit myself to the use of sets of composite conductors in the same slot having all the same characteristics as regards size of sections and intermagnetizable spaces, but where necessary I may vary all these features in order to produce any required variation in the equivalent resistance of the conductor at different frequencies.

What I claim as new and desire to secure by Letters Patent of the United States, is:—

1. The secondary of a dynamo electric machine of the induction type comprising a slotted magnetic structure, a plurality of composite conductors at different depths in the slots, each composite conductor consisting of a plurality of sections, said sections being separated from each other by a magnetizable medium and end connections for causing the conductors to carry the same value of current.

2. The secondary member of a dynamo electric machine of the induction type comprising a slotted magnetic structure and a plurality of sectional conductors at different depths in said slots, said conductor sections being insulated from each other and separated by a magnetizable medium and end connections for connecting sections of different conductors in closed windings in such a manner as to cause all of said conductors to carry the same value of current.

3. A winding for a dynamo electric machine of the type in which the equivalent resistance of the winding increase with the frequency, having two or more composite conductors in a slot, each composite conductor consisting of two or more sections separated from each other by a magnetizable medium together with connections at the ends of the winding so that each composite conductor carries the same current.

4. A winding as claimed in claim 1, characterized by the fact that the sections of the conductors are connected together to form closed coils, the sections being insulated from one another throughout the coil.

In witness whereof, I have hereunto set my hand this 25th day of January, 1922.

H. W. TAYLOR.

Witnesses:
J. A. FOSTER,
D. WHITE.